United States Patent [19]

Haslett

[11] 4,248,439
[45] Feb. 3, 1981

[54] STABILIZED SEAL STRUCTURE

[75] Inventor: Glenn M. Haslett, Peoria, Ill.

[73] Assignee: Caterpillar Tractor Co., Peoria, Ill.

[21] Appl. No.: 136,653

[22] PCT Filed: Oct. 15, 1979

[86] PCT No.: PCT/US79/00841

§ 371 Date: Oct. 15, 1979

§ 102(e) Date: Oct. 15, 1979

[51] Int. Cl.³ .................. F16J 15/32; F16J 15/38
[52] U.S. Cl. ............................... 277/84; 277/92;
277/95; 277/152; 305/11
[58] Field of Search .................... 277/38–43,
277/84, 92, 81 R, 95, 152, 85, 153, 165, 228;
305/11–13

[56] References Cited

U.S. PATENT DOCUMENTS

| 3,614,113 | 10/1971 | Burk | 305/11 X |
| 3,841,718 | 10/1974 | Reinsma | 305/11 |
| 4,062,550 | 12/1977 | Satsumabayashi et al. | 277/92 |
| 4,089,531 | 5/1978 | Roley et al. | 305/11 X |
| 4,132,418 | 1/1979 | Roli | 305/11 X |

FOREIGN PATENT DOCUMENTS

| 2440124 | 3/1975 | Fed. Rep. of Germany | 277/165 |
| 2458529 | 7/1975 | Fed. Rep. of Germany | 277/165 |
| 2526327 | 12/1976 | Fed. Rep. of Germany | 305/11 |

Primary Examiner—Robert S. Ward, Jr.
Attorney, Agent, or Firm—Wegner, Stellman, McCord, Wiles & Wood

[57] ABSTRACT

A stabilized seal structure (24,124,224) for use in a seal space (20,120,220) defined by a first wall (17), a second wall (18) confronting the first wall and variably spaced therefrom, a third wall (19) extending across the seal space between the first and second walls, and a fourth wall (16) extending across the space oppositely of the third wall (19). The seal structure includes a seal member (25,125,225) defining a first leg (26,126,226), a second leg (27,127,227) having a sealing portion (34,134,234) engaging the second wall, and a bight portion (28,128,228) extending adjacent the fourth wall. The legs and bight portion cooperatively define a load member space (29,129,229) receiving a load ring (30,130,230). At least one of the bight portion of the seal ring and the fourth wall is provided with an annular recess (31,13,231) facing the other element. The recess permits compression of the seal ring while effectively maintaining the effective volume of the seal ring space during initial compression of the seal ring by accommodating the portion of the bight of the seal ring overlying the recess during such initial compression. Resultingly, the sealing portion of the seal ring is maintained in effectively fixed relationship to the confronting wall during such initial compression, thereby providing improved stability in the sealing functioning of the seal structure.

19 Claims, 7 Drawing Figures

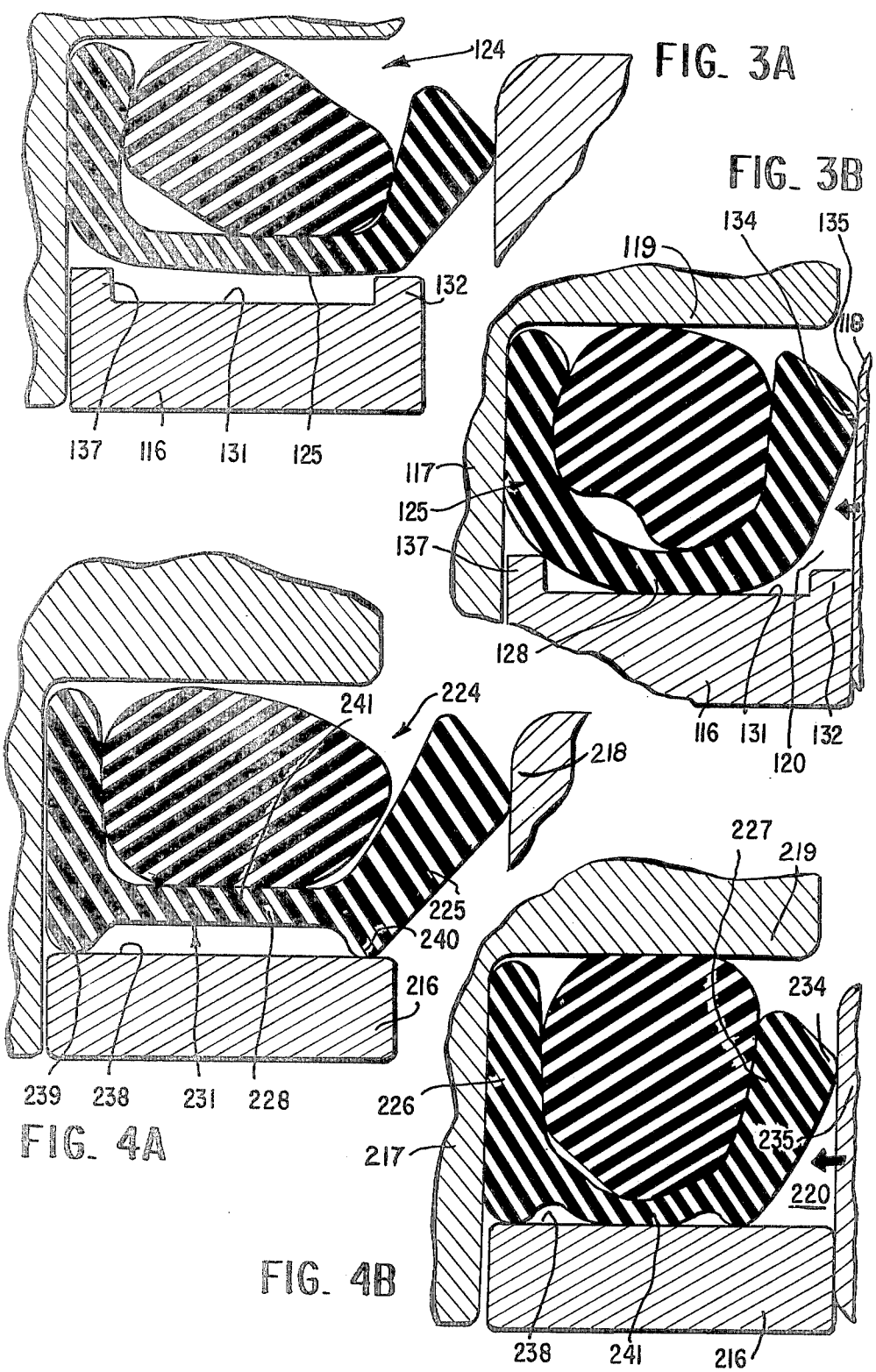

STABILIZED SEAL STRUCTURE

TECHNICAL FIELD

This invention relates to seals, and in particular to seals for use in environments where end play may occur.

BACKGROUND ART

One environment in which seals are utilized wherein end play may occur is that of the track of a track-type material handling vehicle. It is desirable to seal the space between the track pin and associated elements. One example of an improved track pin seal for such purposes is shown in U.S. Pat. No. 3,614,113 of Duane L. Burk, which patent is owned by the assignee hereof. In that patent, an improved spring washer structure is provided for urging an annular boot into sealing engagement with confronting track link structures. As pointed out in the Burk patent, extensive efforts have been made to provide suitable seals for such environments. However, the prior art seals have not proven completely satisfactory.

DISCLOSURE OF INVENTION

The present invention comprehends an improved stabilized seal structure for use in such environments providing improved ability to accommodate end play.

More specifically, the invention comprehends such an improved stabilized seal structure wherein the sealing portion of the seal ring is maintained effectively fixed relative to the axially movable member over a substantial range of compression of the seal resulting from such axial movement of the environmental members.

The improved stabilized seal structure of the present invention permits a preselected amount of end play without decreasing the effective seal space volume.

More specifically, the invention comprehends providing such a stabilized seal structure wherein the seal ring is permitted to expand into a recess in one of the wall members defining the seal space during an initial loading of the seal by the axial movement of the environmental wall member.

In the illustrated embodiment, one of the walls defining the seal space is provided with a recess. During compression of the seal, a portion thereof may move into the recess so as to effectively maintain the seal space volume during the initial compression thereof.

Resultingly, the contact of the seal with the movable wall is effectively fixed so as to stabilize the seal and provide long troublefree life thereof.

In the illustrated embodiment, the seal ring has a C-shaped cross section with a load ring being disposed in a load ring space defined thereby. Compression of the seal ring urges the load ring against one of the wall members so as to provide a suitable compression-resisting force in effecting the desired seal between the seal ring and the associated environmental wall members.

The seal defines a bight portion of its C-shaped cross section which is disposed so as to be movable into the recess during the initial compression of the seal. One of the legs of the seal sealingly engages the movable wall member and is effectively maintained in fixed relationship thereto during the initial compression as a result of the movement of the bight portion into the recess during such movement.

Upon completion of the initial phase of the seal compression, the seal is then allowed to be compressed in the normal manner so as to provide the desired final sealing engagement between the seal and the confronting wall members.

The stabilized seal structure of the present invention is extremely simple and economical of construction while yet providing the highly desirable features discussed above.

BRIEF DESCRIPTION OF THE DRAWING

FIG. 3a is a fragmentary diametric section illustrating a modified form of stabilized seal structure embodying the invention;

FIG. 3b is a fragmentary diametric section similar to that of FIG. 3a but illustrating the seal structure in the final sealed arrangement;

FIG. 4a is a fragmentary diametric section illustrating a further modified form of stabilized seal structure embodying the invention; and FIG. 4b is a fragmentary diametric section generally similar to that of FIG. 4a but illustrating the seal structure thereof in the final sealed arrangement.

BEST MODE FOR CARRYING OUT THE INVENTION

Figure 1:
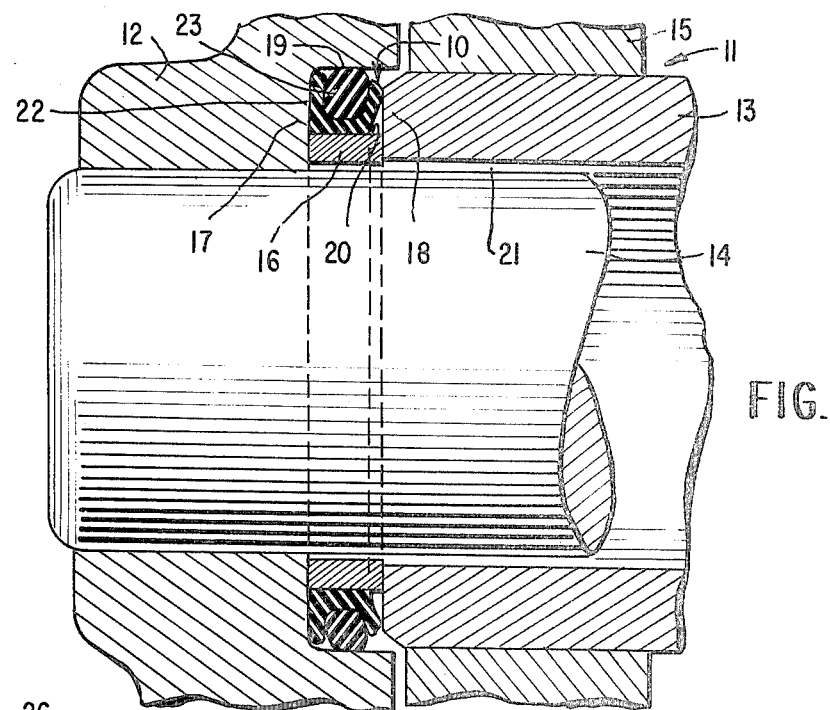
FIG. 1 is a fragmentary diametric section of a track chain link provided with a seal such as utilized in the prior art.

As shown in FIG. 1, a seal structure generally designated 10 may be utilized for sealing apparatus, such as track pin apparatus generally designated 11, such as for use in track-type tractors or similar earthworking vehicles. Such environmental structure presents a problem in the sealing thereof because of end play such as may occur between an end member, such as end member 12, and the bushing 13 receiving the track pin 14. As shown in FIG. 1, the bushing 13 may be fixed in a link 15 of the track chain 11 and a sleeve 16 may be provided between the outer end of the bushing 13 and the confronting inner surface of the outer member 12.

More specifically, as shown in FIG. 1, member 12 may define a first wall portion 17 spaced outwardly from a second wall portion 18 defined by the outer end of the bushing 13. The outer member 12 may further define a third wall portion 19 spaced radially outwardly from the sleeve 16 which effectively defines a fourth wall portion. Thus, as shown in FIG. 1, wall portions 17, 18, 19 and 16 cooperatively define a seal space generally designated 20 in which the seal structure 10 is disposed for effectively sealing the annular space 21 between the track pin 14 and bushing 13 against ingress of foreign matter, etc.

As indicated above, end play between the member 12, which may comprise one of the links of the track chain 11, and the bushing 13 may occur in the normal use of the track chain. Seal structure 10 therefore must accommodate the joint end play. To accommodate such end play, initial compression of the seal is conventionally provided and a substantial compressibility of the seal is similarly provided. These factors have resulted in prior art structures, such as shown in FIG. 1, in instability of the seal wherein the portion of the seal engaging the movable wall, such as wall 18, is caused to move along the surface thereof, thereby reducing the effective sealing engagement therebetween.

The prior art seal structure 10 may comprise an improved seal arrangement utilizing a C-section seal ring 22 and a load ring 23. Such sealing structures are generally well known in the art and are conventionally called cartridge-type face seals.

Figure 2A:
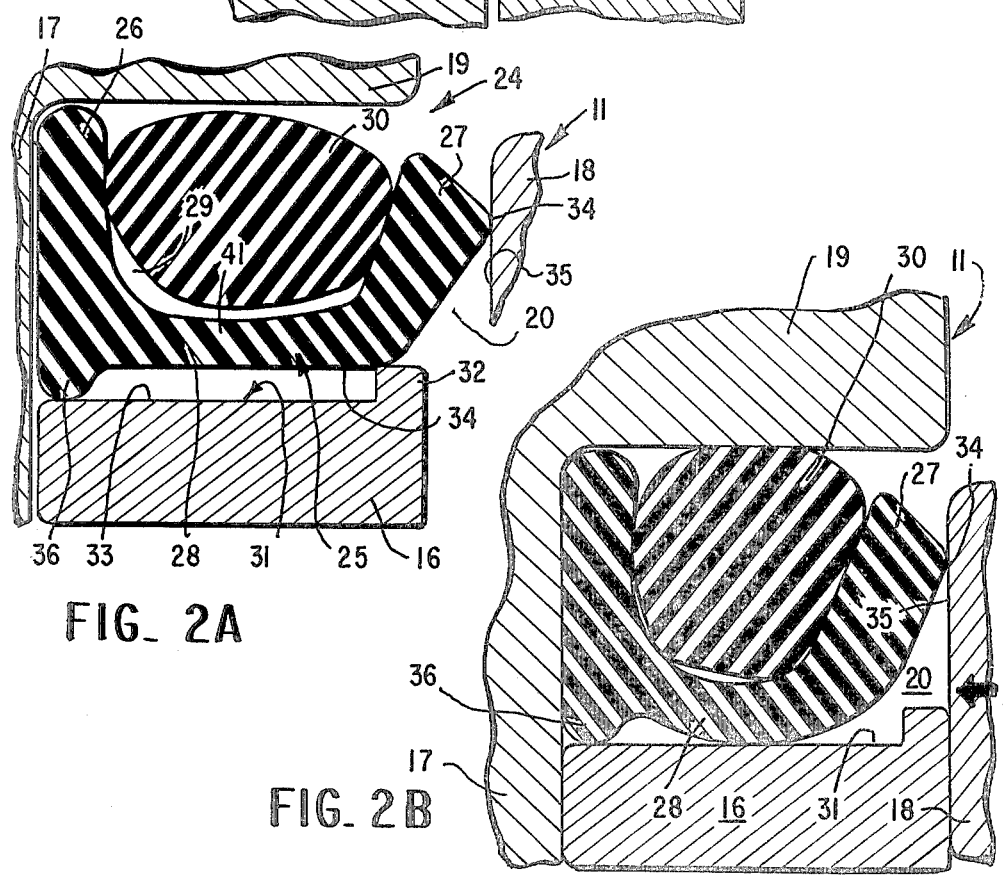
FIG. 2a is a fragmentary enlarged diametric section illustrating an improved stabilized seal structure embodying the invention, the seal structure being shown in a partially installed arrangement.
Figure 2B:
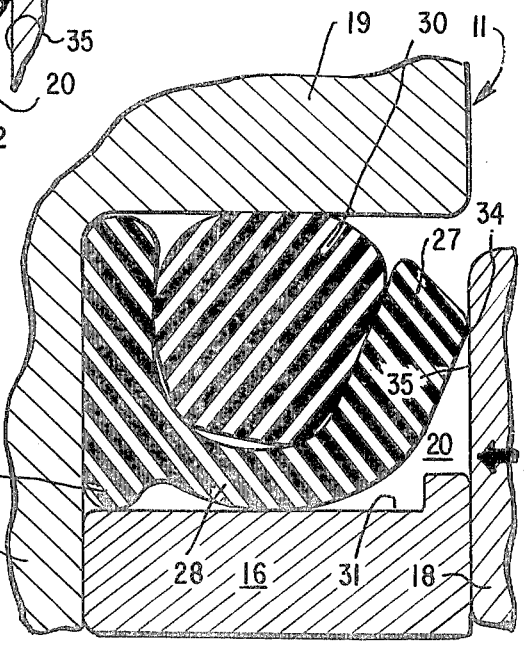
FIG. 2b is a fragmentary diametric section similar to that of FIG. 2a but illustrating the seal in a final sealed arrangement.

Referring now more specifically to FIGS. 2a and 2b, an improved stabilized seal structure generally designated 24 is shown to define a seal member 25 having a C-shaped cross section defined by a first leg 26, an opposite second leg 27, and a bight portion 28. Leg 26 is juxtaposed to wall 17, leg 27 is juxtaposed to wall 18, and bight portion 28 is juxtaposed to the fourth wall 16 which may comprise the thrust ring of the track assembly.

Legs 26 and 27 cooperate with bight 28 in defining a load member space 29 in which is received a load member 30. In the illustrated embodiment, each of the walls 17, 18, 19 and 16 comprises an annular wall, the load member space 20 comprises an annular space, the seal member 25 comprises a seal ring, and the load member 30 comprises a load ring. Thus, the wall member 17 is at the outer axial end of seal ring space 20, wall 18 is at the axial inner end of the seal ring space, wall 19 defines the radially outer boundary of the seal ring space 20, and thrust ring 16 defines the radially inner boundary of the seal ring space.

The invention comprehends the provision in one of the bight 28 of the seal ring 25 or the wall 16 of the environmental structure 11 of a recess facing the other element. Thus, as shown in FIG. 2a, a recess 31 may be provided in the wall 16 opening radially outwardly toward the seal ring bight portion 28. The wall 16 further defines an annular lip 32 at the axial inner end of the recess 31. As shown in FIG. 2a, the lip 32 may be aligned with the leg 27 of seal ring 25. In the uncompressed condition of FIG. 2a, the seal ring rests on the lip 32 so as to effectively dispose the bight portion 28 of the seal ring radially outwardly of the recess 31. In the illustrated embodiment, the bottom surface 33 of the recess is right circularly cylindrical and the undistorted radially inner surface 34 of the seal ring bight portion 28 is similarly right circularly cylindrical.

Leg 27 of the seal ring defines a sealing tip portion 34 which engages the wall 18, as shown in FIG. 2a, at a portion 35.

Referring now to FIG. 2b, when the width of seal ring space 20 is reduced as by more closely juxtaposing walls 17 and 18, deflection of the leg 27 causes compression of the seal ring suitably to urge bight 28 into recess 31, thereby causing the effective volume of the seal space 20 to remain substantially constant and cause the engagement of the seal ring surface 34 with the sealing wall surface 35 to remain substantially fixed, thereby effectively stabilizing the sealing action. As shown in FIG. 2b, in such disposition, load ring 30 effectively urges the confronting portions of the seal ring into sealing engagement with the associated walls of the structure 11 to provide the desired effective seal. Resultingly, notwithstanding end play causing variable spacing between walls 17 and 18, the sealing engagement between sealing portions 34 and 35 of the illustrated structure is effectively maintained, thereby providing an improved stabilized seal structure.

As shown in FIGS. 2a and 2b, the seal member may include an annular projection 36 extending toward the thrust ring 16 adjacent wall 17 and cooperating with lip 32 in defining the recess 31.

Referring now to FIGS. 3a and 3b, a modified form of stablized seal structure generally designated 124 is shown to comprise a seal structure generally similar to that of seal structure 24 but wherein the radially inwardly extending projection is omitted on the seal ring 125 and the wall 18 defines a radially outwardly opening recess 131 defined at its axially outer end by an annular lip 137, in addition to the annular lip 132 at the axially inner end thereof. Thus, as shown in FIG. 3b, the bight portion 128 of the seal ring 125 is urged downwardly into the recess 131 between the two lips 137 and 132 as a result of a decrease in the spacing between walls 18 and 19 in the use of the apparatus.

Thus, stabilized seal structure 124 functions generally similar to seal structure 24 in effectively maintaining the volume of the seal space 120 during initial compression of the seal ring by utilizing the recess 131 to accommodate a portion of the seal ring during such movement. Thus, the sealing portion 134 of seal ring 125 is effectively maintained fixed relative to the sealing portion 135 of the wall 19.

As shown in FIG. 3b, movement of the walls 18 and 19 toward each other is limited by the axial extent of the thrust ring 116.

Referring now more specifically to the embodiment of FIGS. 4a and 4b, a further modified form of stabilized seal structure generally designated 224 is shown to comprise a seal structure generally similar to seal structure 24 but wherein the recess is provided in the seal ring rather than in the wall 16. Thus, as shown in FIG. 4a, the bight portion 228 of the seal ring 225 defines a radially inwardly opening recess generally designated 231 with the radially outer surface 238 of thrust ring wall 216 being unrecessed. In the illustrated embodiment, wall surface 238 comprises a right circularly cylindrical wall surface.

The seal ring 225 may further define radially inwardly projecting lips 239 and 240 at the opposite ends of the recess 231. Lips 239 and 240 engage the surface 238 so as to space the bight portion 241 overlying the recess 231 radially outwardly from surface 238 in the uncompressed condition of the seal ring illustrated in FIG. 4a.

As a result of a decrease in the space between walls 18 and 19, as shown in FIG. 4b, bight portion 241 is deflected into engagement with the wall surface 238 so as to maintain effectively fixed the engagement between seal ring portion 234 and wall portion 235. Thus, stabilized seal structure 224 functions similarly to stabilized seal structure 24 in providing an effectively maintained constant volume of the seal space during initial compression of the seal ring so as to effect the desired stability of the sealing engagement of the seal ring with the wall 19.

As may be noted in FIG. 4b, the thrust ring 216 effectively limits the decrease in spacing between walls 18 and 19 similarly as does thrust ring 116 in the stabilized seal structure 124.

Thus, each of the embodiments of the stabilized seal structures discussed above provides an improved maintained effectively constant seal space volume during initial compression of the seal ring and resultingly maintains an effectively stabilized, or fixed, sealing engagement between the seal ring and the confronting movable wall member notwithstanding deflection of the seal ring leg defining the sealing portion. In each of the embodiments, similar elements or structures are identified by similar reference numerals but 100 different.

INDUSTRIAL APPLICABILITY

The improved stabilized seal structures of the present invention may be utilized in a wide range of industrial applications wherein end play or similar movement presents a problem relative to maintained stabilized sealing between a face seal and the environmental structures. In the illustrated embodiment, the improved stabilized seal structures have been shown as used in a tractor vehicle track chain environment, it being understood that the seal structures may be utilized in a wide range of industrial applications in addition thereto.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. A stabilized seal structure (24,124,224) comprising:
   a first wall (17,117,217);
   a second wall (18,118,218) confronting said first wall and variably spaced therefrom to define a variable width seal space therebetween;
   a third wall (19,119,219) extending across said space at one transverse boundary thereof;
   a fourth wall (16,116,216) extending across said space at the transverse boundary thereof opposite said one boundary;
   a seal member (25,125,225) having a C-shaped cross section defining a first leg (26,126,226) engaging said first wall, a second leg (27,127,227) having a sealing end portion (34,134,234) movably engaging said second wall seal portion (35,135,235), and a bight portion (28,128,228) extending adjacent said fourth wall and seal bight portion cooperatively defining a load member space (29,129,229), one of said fourth wall and seal member bight portion being provided with a recess (31,131,231) opening toward the other; and
   a load member (30,130,230) disposed in said load member space and confronting said third wall, said load member being urged against said third wall and urging said seal member bight portion (41,141,241) overlying said recess into said recess to maintain the engagement of said sealing end portion of the seal member second leg with said second wall being substantially fixed as an incident of initial relative movement between said first and second walls reducing said space (20,120,220) width.

2. The stabilized seal structure of claim 1 wherein said walls (17,18,19,16,117,118,119,116,217, 218,219,216) define annular surfaces engaged by said seal member and load ring, and said seal member (25,125,225) and load member (30,130,230) comprise annular members.

3. The stabilized seal structure of claim 1 wherein said fourth wall (16,116,216) is variably spaced from said first wall (17,117,217) and said seal member (25,125,225) includes a portion (36) projecting to said fourth wall adjacent said first wall.

4. The stabilized seal structure of claim 1 wherein said fourth wall (16,116,216) defines a support portion (32,132) facing said seal space (20,120) adjacent said second wall (18,118), said seal member (25,125) engaging said support portion when said second wall (18,118,218) is spaced from said fourth wall (16,116,216) and urged by said second wall (18,118,218) from said support portion and into said recess (31,131) as an incident of said second wall moving into engagement with said fourth wall.

5. The stabilized seal structure of claim 1 wherein said seal member bight portion (41,141,241) is disposed fully outwardly of said recess (31,131,231) as an incident of said second wall (18,118,218) being spaced at least a preselected distance from said first wall (17,117,217).

6. A stabilized seal structure (24,124) comprising:
   a first annular wall (17,117);
   a second annular wall (18,118) confronting said first wall and variably spaced therefrom to define a variable width annular seal space therebetween;
   a third annular wall (19,119) extending across said space at one radial boundary thereof;
   a fourth annular wall (16,116) extending across said space at the radial boundary thereof opposite said one radial boundary, one of said third and fourth wall members (19,119,16,116) having a recess (31,131) opening radially toward the other;
   a seal ring (25,125) having a C-shaped cross section defining a first leg (26,126) engaging said first wall, a second leg (27,127) having a sealing end portion (34,134) movably engaging said second wall, and a bight portion (28,128) extending across said recess in an unloaded condition of the seal member, said legs and bight portion cooperatively defining a load member space (29,129); and
   a load ring (30,130) disposed in said load ring space and having an outer surface confronting the wall opposite said recess, said load ring being urged against said wall opposite said recess and urging said seal ring bight portion (41,141) into said recess to maintain the engagement of said sealing end portion of the seal ring second leg with said second wall being substantially fixed as an incident of initial relative movement between said first and second walls reducing said annular seal space (20,120) width.

7. The stabilized seal structure of claim 6 wherein said recess (31) further opens axially toward said first wall (17).

8. The stabilized seal structure of claim 6 wherein said seal ring (25) includes a portion (26) projecting between said first (17) and fourth (16) walls and compressed therebetween as an incident of said fourth wall (16) being urged toward said first wall (17) by axial movement of said second wall (18) toward said first wall (17).

9. The stabilized seal structure of claim 6 wherein said recess (31,131) defines a right circularly cylindrical bottom surface (33,133).

10. The stabilized seal structure of claim 6 wherein said recess (31,131) is defined by an annular lip (32,132) at the axial end of said fourth wall (16,116) adjacent said second wall (18,118).

11. The stabilized seal structure of claim 6 wherein said third wall (19,119) faces radially inwardly and said fourth wall (16,116) faces radially outwardly, said recess (31,131) being disposed in said fourth wall (16,116) to face radially outwardly therefrom.

12. The stabilized seal structure of claim 6 wherein said recess (131) is defined by a pair of annular lips (132,137) at the opposite axial ends of said fourth wall (116).

13. The stabilized seal structure of claim 6 wherein said recess (131) is defined by a pair of different size annular lips (132,137) at the opposite axial ends of said fourth wall (116).

14. The stabilized seal structure of claim 6 wherein said recess (131) is defined by a pair of annular lips (132,137) at the opposite axial ends of said fourth wall (116), the lip (137) adjacent said first wall (117) being larger than the lip (132) adjacent said second wall (118).

15. A stabilized seal structure (224) comprising:
a first wall (217);
a second wall (128) confronting said first wall and variably spaced therefrom to define a variable width seal space therebetween;
a third wall (219) extending across said space at one transverse boundary thereof;
a fourth wall (216) extending across said space at the transverse boundary thereof opposite said one boundary;
a seal member (225) having a C-shaped cross section defining a first leg (226) engaging said first wall, a second leg (227) having a sealing end portion (234) movably engaging said second wall, and a bight portion (228) extending adjacent said fourth wall in an unloaded condition of the seal member, said legs and bight portion cooperatively defining a load member space (229), said bight (228) defining a recess (231) opening toward said fourth wall (216); and
a load member (230) disposed in said load ring space and having an outer surface confronting said third wall (219), said load member being urged against said third wall and deforming the portion of said seal member bight portion (241) radially of said recess (231) toward said fourth wall (216) with the portions (239,240) of the seam member (225) at opposite sides of the recess (231) being urged into engagement with said fourth wall (216) to maintain the engagement of said sealing end portion of the seal member second leg with said second wall being substantially fixed as an incident of initial relative movement between said first and second walls reducing said seal space width.

16. The stabilized seal structure of claim 15 wherein said recess (231) defines a right circularly cylindrical bottom surface (238).

17. The stabilized seal structure of claim 15 wherein said seal member (225) defines a pair of annular lips (239,240) at opposite sides of said recess (231) engaging said fourth wall (216).

18. The stabilized seal structure of claim 15 wherein said seal member (225) defines a pair of annular rounded lips (239,240) at opposite sides of said recess (231) engaging said fourth wall (216).

19. The stabilized seal structure of claim 15 wherein said seal member (225) defines a pair of annular lips (239,240) aligned with said legs (226,227) at opposite sides of said recess (231) engaging said fourth wall (216).

* * * * *